(12) United States Patent
Jasapara

(10) Patent No.: US 7,057,735 B2
(45) Date of Patent: Jun. 6, 2006

(54) METHOD FOR MEASURING THE OPTICAL AND PHYSICAL THICKNESS OF OPTICALLY TRANSPARENT OBJECTS

(75) Inventor: Jayesh Jasapara, North Plainfield, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 256 days.

(21) Appl. No.: 10/704,057

(22) Filed: Nov. 6, 2003

(65) Prior Publication Data
US 2004/0145747 A1 Jul. 29, 2004

Related U.S. Application Data

(60) Provisional application No. 60/426,272, filed on Nov. 14, 2002.

(51) Int. Cl.
*G01B 9/02* (2006.01)

(52) U.S. Cl. .................. 356/485; 356/503; 356/504; 356/477

(58) Field of Classification Search ............... 356/503, 356/504, 485, 477, 479; 250/277.19, 277.27, 250/227.19, 227.27
See application file for complete search history.

(56) References Cited

U.S. PATENT DOCUMENTS

| 4,021,217 A | 5/1977 | Bondybey et al. |
| 5,228,893 A | 7/1993 | Smithgall et al. |
| 5,657,124 A * | 8/1997 | Zhang et al. ............... 356/485 |
| 5,828,448 A | 10/1998 | Jakobsen et al. |
| 6,633,392 B1 * | 10/2003 | Singh et al. ............... 356/630 |

OTHER PUBLICATIONS

A. Ashkin, J.M. Dziedzic, R. H. Stolen, "Outer Diameter Measurement of Low Birefringence Optical Fibers by a New Resonant Backscatter Technique" Applied Optics, Jul. 1, 1981, vol. 20, No. 13.

* cited by examiner

*Primary Examiner*—Gregory Toatley
*Assistant Examiner*—Marissa J Detschel

(57) ABSTRACT

A method and apparatus for measuring the optical thickness and absolute physical thickness of an optically transparent object utilizes a reflective interferometric process. A broadband optical signal is directed toward the object to be measured, and a pair of signals reflected off of the object are processed to determine the optical thickness of the object. When used with an optical fiber preform, the technique can be used to measure the outer diameter of the preform and control the drawing process. If the index of refraction of optically transparent object is known, the absolute physical thickness can also be determined.

1 Claim, 4 Drawing Sheets

METHOD FOR MEASURING THE OPTICAL AND PHYSICAL THICKNESS OF OPTICALLY TRANSPARENT OBJECTS

CROSS-REFERENCE TO RELATED APPLICATION

This application claims the benefit of U.S. Provisional Application No. 60/426,272, filed Nov. 14, 2002.

FIELD OF THE INVENTION

The present invention relates to a method and apparatus for measuring the thickness of an optically transparent object (such as an optical fiber or preform) and, more particularly, to the use of a reflective interferometric technique that may provide for continuous and accurate measurements while be located remotely from the fiber processing area.

BACKGROUND OF THE INVENTION

During the process of drawing an optical fiber from a glass preform, there is an ongoing need to accurately characterize the dimensions of the fiber in order to understand, predict and control its properties and their effects on signal propagation. Additionally, during the fabrication of the preform itself, it is desirable to characterize and control the dimensions of various layers being deposited on or in a preform tube. For example, when using an MCVD technique, there is a need to continuously monitor the inner diameter of the glass tube so that the amount of deposited soot can be accurately determined.

The conventional techniques used today to provide dimension characterization during optical fiber fabrication either exhibit a relatively low degree of accuracy or cannot be easily implemented in a manufacturing environment for continuous, on-line monitoring and control.

Most draw towers use commercial devices based on a technique referred to as "shadowing" for measuring fiber diameter during the draw process (or preform inner diameter during soot deposition). In this technique, a laser light is scanned across the target object (fiber or preform), where the change in transmission is then analyzed to retrieve the dimension of the target object. In most cases, the accuracy of this technique is on the order of about 0.1 µm—and requires averaging, where the averaging makes this technique relatively slow. Moreover, this technique requires calibration and cannot detect the presence of air pockets that may arise during the fiber draw process.

An alternative interferometric technique, referred to in the art as "FOCSL", which stands for "Fiber Optic Characterization by Scattering Light", counts the number of fringes that are produced due to interference between the light that is transmitted through an object and the light that is reflected off of the object. In comparison to the above-mentioned technique, FOCSL exhibits an accuracy on the order of about 0.05 µm. Other interferometric techniques exist in which a single frequency is scanned across the object and the phase difference with and without the object is measured to determine the object's diameter.

Most interferometric techniques are capable of measuring only the optical thickness, which is a product of the refractive index and the physical thickness. The physical thickness is determined by assuming the value of the refractive index and dividing this value by the measured optical thickness. However, there are cases when the refractive index is not known very accurately, such as in the case during thin film growth. It is therefore desirable to have a technique available that is able to measure both refractive index and physical thickness independently.

In most cases, optical fibers are coated with a dual (primary and secondary) polymer coating. The bend loss of the fiber depends on the primary coating thickness. Currently, there is no way to monitor the primary coating diameter while the fiber is still in place on the draw apparatus.

The available prior art measurement techniques all rely on analyzing light that is forward scattered through the fiber/preform, and therefore requires that detectors and light collection optics be placed on the drawing apparatus. This requirement is often cumbersome due to space limitations associated with most draw towers.

Thus, a need remains in the art for an arrangement capable of characterizing an optically transparent object, such as a fiber or preform, which is continuous in nature, accurate, and can be located remotely from the drawing apparatus.

SUMMARY OF THE INVENTION

The need remaining in the prior art is addressed by the present invention, which relates to a method and apparatus for measuring the thickness of an optically transparent object (such as an optical fiber or preform) and, more particularly, to the use of a reflective interferometric technique that may provide for continuous and accurate measurements while being located remotely from the fiber processing area.

In accordance with the present invention, a broadband pulse from a light source is directed at the object to be measured, and focused onto the object through a first lens. The reflected light from the object is then collected by this first lens and passed through a beamsplitter so as to be directed away from the light source, through a second lens, and ultimately into a spectrometer. The spectrogram output is then analyzed to determine the dimensions of the measured object.

When used to measure the diameter of a fiber, the arrangement of the present invention will received reflections from two interfaces: (1) the "near" fiber outer surface/air interface; and (2) the "far" fiber outer surface/air interface. The light reflected from the far side will have propagated through the fiber twice and interferes with the light reflected from the near interface. The phase difference between these two signals manifests itself as a beat signal in the spectral domain, and can therefore be used to determine the physical diameter of the fiber. In essence, the fiber functions as an interferometer whose arm lengths differ by the optical thickness of the fiber.

When used to measure the inner diameter of an optical fiber preform, the air/soot interfaces on each side of the preform will function as reflective surfaces, yielding the ability to perform a measurement as discussed above.

In accordance with the present invention, the reflective interferometric technique can be used in conjunction with an independent measurement system to determine two different variables, such as diameter and refractive index, or the diameter of different layers within the fiber.

Various other advantages and uses of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
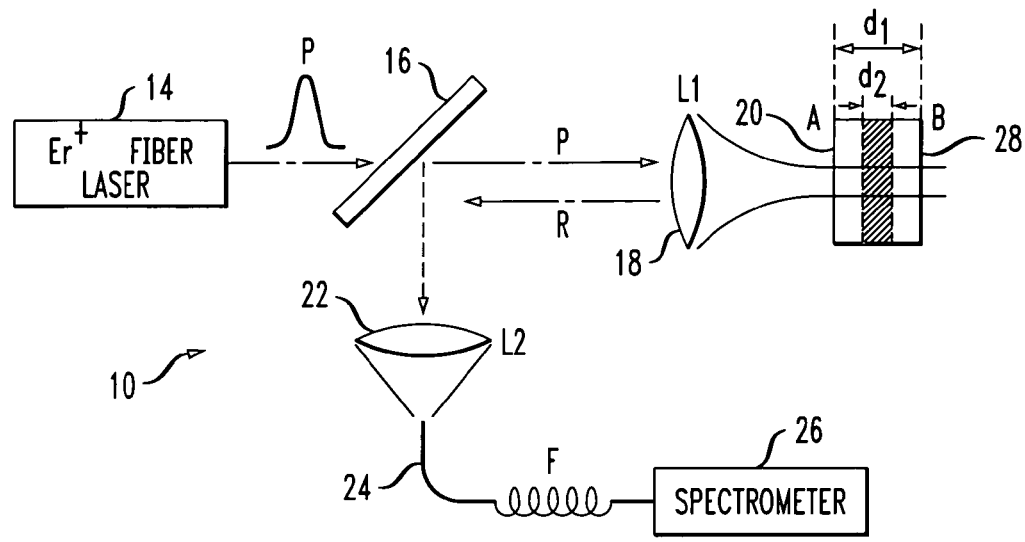
FIG. 1 illustrates an exemplary reflective interferometric measuring arrangement formed in accordance with the present invention.

FIG. 1 illustrates an exemplary reflective interferometric arrangement 10 for measuring the thickness of an optically transparent object. In the example as shown in FIG. 1, an optical fiber 12 is the object being measured. It is to be understood that the technique of the present invention, as will be discussed below, may be used to measure the dimensions of an optical preform or, in general, any optically transparent object.

Referring back to FIG. 1, a broadband optical pulse P from a light source 14 passes through a beamsplitter 16 and is directed by a focusing lens 18 onto a side surface 20 of optical fiber 12. In a preferred embodiment, a light source such as a mode-locked laser is used. The light reflected off of fiber 12 then propagates in the reverse direction R, where it is collimated by lens 18, and then is re-directed by beamsplitter 16 into a second lens 22, where the reflected light from lens 22 is thereafter focused into a light path 24 (such as an optical fiber or other waveguide) and then into a spectrometer 26 where the measurements are performed and the dimensions of fiber 12 are determined.

The reflected light R comes mainly from the two interfaces between fiber 12 and the surrounding air. The first interface is side surface 20, while the second interface is opposing side surface 28. For the purposes of the present invention, any reflections from the core features are orders of magnitude smaller that the glass/air reflection and can therefore be ignored. As shown, the light from interface 28 propagates twice through fiber 12 and then interferes with the light reflected from interface 20. The phase difference between the two reflections manifests itself, as mentioned above, as a beating in the spectral domain with the peaks occurring at wavelengths where the phase difference is an integral multiple of $2\pi$, where $4\pi L/\lambda_p + \pi = 2\pi p$ is satisfied (p is an integer, L is the optical path length (defined as the refractive index multiplied by the physical path length) for one trip through the fiber, and $\lambda_p$ is the wavelength of the $p^{th}$ peak). The fiber thus acts as an interferometer whose arm lengths differ by the optical thickness of the fiber. Since no external reference arm is required, the measurement is robust to small fiber displacements within the focus.

As is well known, a change in optical path length $\delta L$ causes a shift in the peak wavelength $\delta\lambda$ as follows:

$$\frac{\delta L}{L} = \frac{\delta\lambda}{\lambda_p}$$

Therefore, the sensitivity of the technique of the present invention depends on the minimum detectable shift in the fringe peak wavelength, which is equal to the resolution of the spectrometer used.

Figure 2:
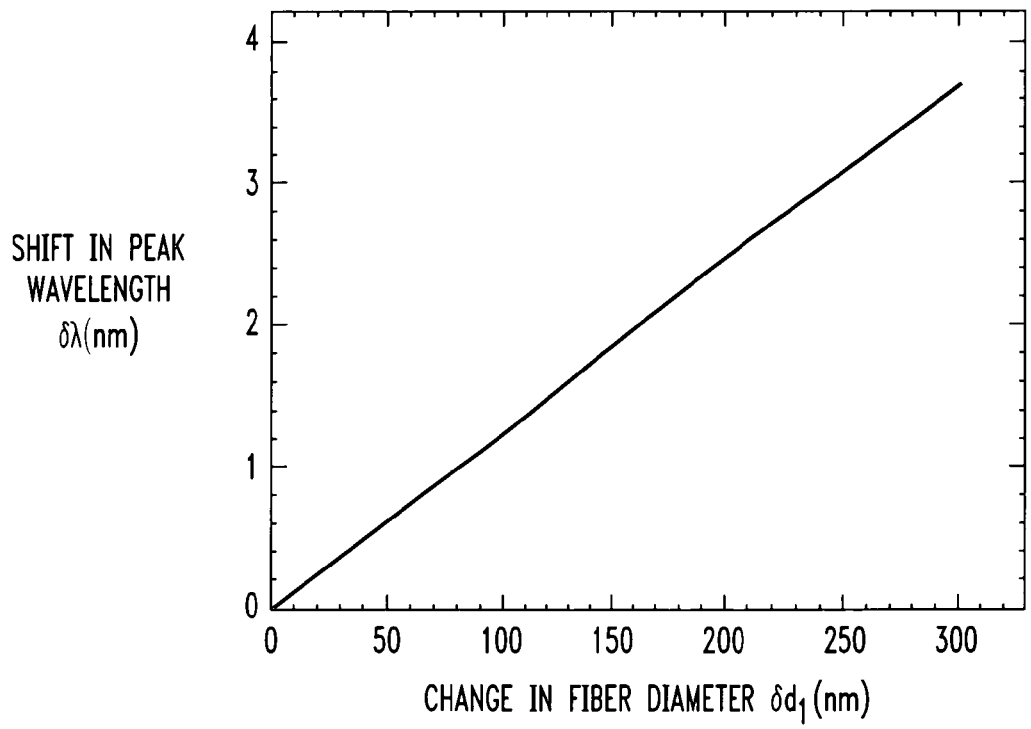
FIG. 2 is a graph depicting the shift in wavelength peak location as a function of change in thickness of a measured fiber diameter.

FIG. 2 contains a graph illustrating the shift in fringe peak location as a function of the change in fiber thickness. As an example, if a resolution of 0.05 nm is presumed for the measurement, then for a fiber optical path length L=125 µm and wavelength $\lambda_p$ of approximately 1.55 µm, the minimum detectable change in thickness is approximately 4.0 nm. The technique of the present invention can therefore improve the accuracy of measuring fiber diameter by about an order of magnitude over the prior art techniques. The location of the interference peak can be used as a signal to control the draw of a fiber in the draw tower by using the measurement technique of the present invention.

Besides the high degree of accuracy, the reflective interferometric measurement technique of the present invention also allows for an absolute determination of optical path length while not requiring calibration. Since the interference pattern depends on the optical path length through the fiber, defects such as air bubbles can be easily detected. The technique is robust to small displacements of the fiber in the focus and can be used to make measurements while the fiber is being drawn. Since the technique of the present invention uses reflected light, the collection optics and detectors need not be situated near the fiber being measured. This is considered to be a significant advantage for measurements being made on the fiber draw tower where space is limited.

Figure 3:
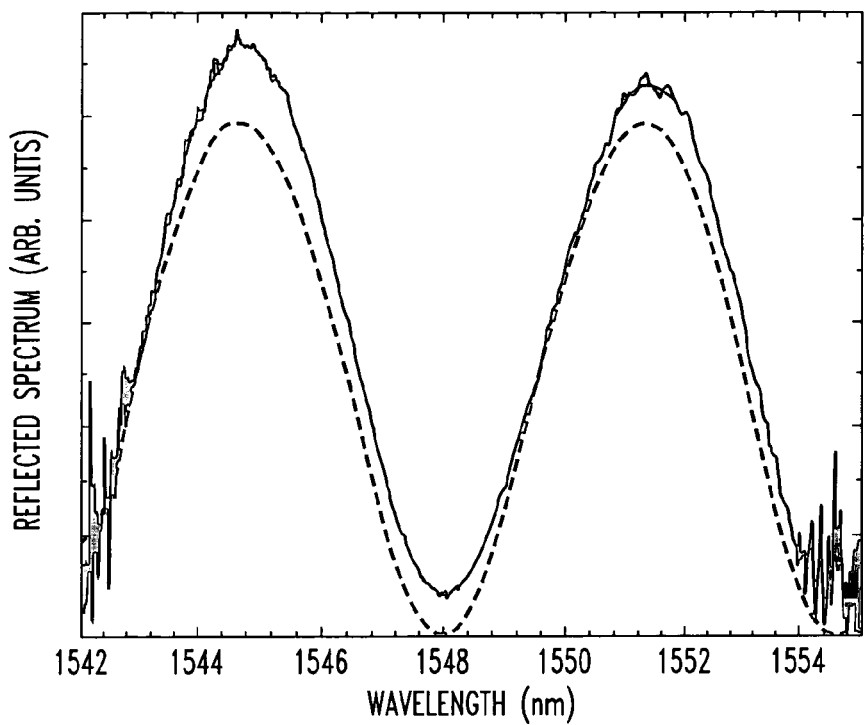
FIG. 3 is a graph showing both the measured reflection spectrogram from an uncoated optical fiber using the system of FIG. 1 and, for comparison purposes, a simulated value.
Figure 4:
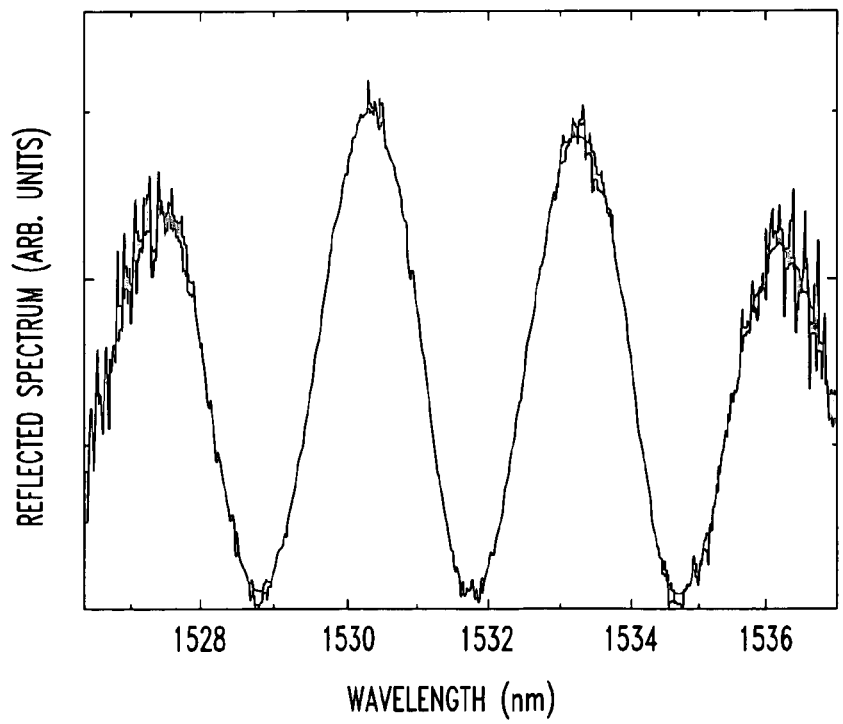
FIG. 4 is a graph showing the measured reflection spectrogram from a polymer coated optical fiber.

FIG. 3 contains two plots, the solid line illustrating the measured spectrogram of a reflected signal R, and the dashed line showing the associated calculated value. Using the arrangement as shown in FIG. 1, an uncoated signal mode fiber was positioned as shown with respect to first lens 18. For these measurements an $Er^+$-doped fiber laser source 14 was focused with a first lens 18 having a focal length of approximately 5.0 cm onto an uncoated section of single mode fiber. The retro-reflected light signal R was directed by beamsplitter 16 into an optical spectrum analyzer (OSA), where the OSA was set to have a resolution of 0.05 nm. FIG. 4 illustrates the same test arrangement, recording the results for a coated fiber. Referring to the graphs of FIGS. 3 and 4, the function $\cos(4\pi L/\lambda + \pi)$ is optimized for L so that its peaks match those of the recorded spectrogram. The optical path length L is then divided by the refractive index (which is presumed to be a known quantity) to yield the physical fiber diameter.

As mentioned above, there may be cases where there are two "unknowns" in characterizing a fiber (or preform). In some cases, both the fiber diameter and refractive index may be unknown. In other cases, the diameters of an inner fiber diameter (such as the core) and an outer fiber diameter (cladding) may be unknown. In principle, the measurement technique of the present invention may be combined with another independent measurement technique to determine both of the unknown parameters.

Referring to the latter case, which is illustrated in FIG. 1, the inner diameter $d_2$ of the core region and the total fiber diameter $d_1$ may both be unknown, where each region also exhibits a different refractive index. The complete fiber diameter $d_1$ may first be measured using a conventional prior art technique. The reflective interferometric arrangement of the present invention, which depends on the optical path through the fiber, yields the optical thickness, defined as $n_2 d_2 + n_1(d_1 - d_2)$. As long as both of the refractive indices are known, these two measurements can then be used to define both $d_1$ and $d_2$.

Figure 5:
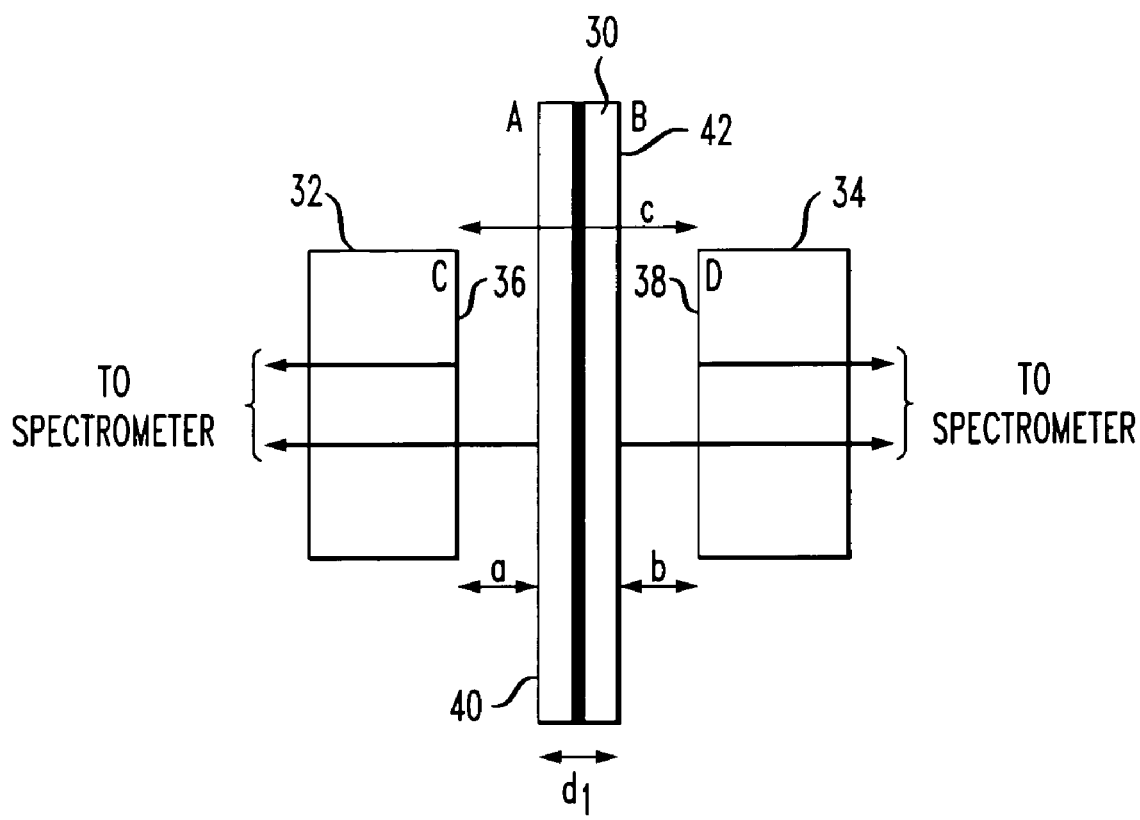
FIG. 5 illustrates an arrangement of the present invention when used to measure the diameter of a fiber with an unknown refractive index.

The inventive technique may also be used to accurately measure the diameter of a fiber with an unknown refractive index, using the arrangement as shown in FIG. 5. In this arrangement, a fiber 30 is placed between a pair of windows 32 and 34, where the distance a between backface 36 of window 32 and fiber 30, as well as the distance b between backface 38 of window 34 and fiber 30, are well-controlled. Surfaces 40 and 42 of fiber 30 form Fabry-Perot cavities with backfaces 36 and 38, respectively. A first reflective interferometric measuring apparatus 10-1 is disposed to direct a measurement test signal through window 32 and into fiber 30. A second reflective interferometric measuring apparatus 10-2 is disposed to direct a measurement test signal through window 34 and into fiber 30. By measuring the resonance wavelength of these cavities, the distances a and b can be determined. The distance c between windows 32 and 34 is held constant, and can be calibrated by inserting a fiber of known thickness between the windows. The outer diameter $d_1$ of the fiber can then be accurately determined, since $d_1 = c - a - b$.

Figure 6:
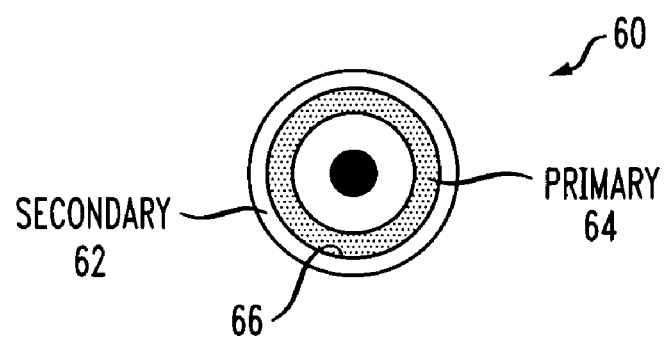
FIG. 6 illustrates a cross-sectional view of an optical fiber preform including an internal soot layer deposited using an MCVD process.
Figure 7:
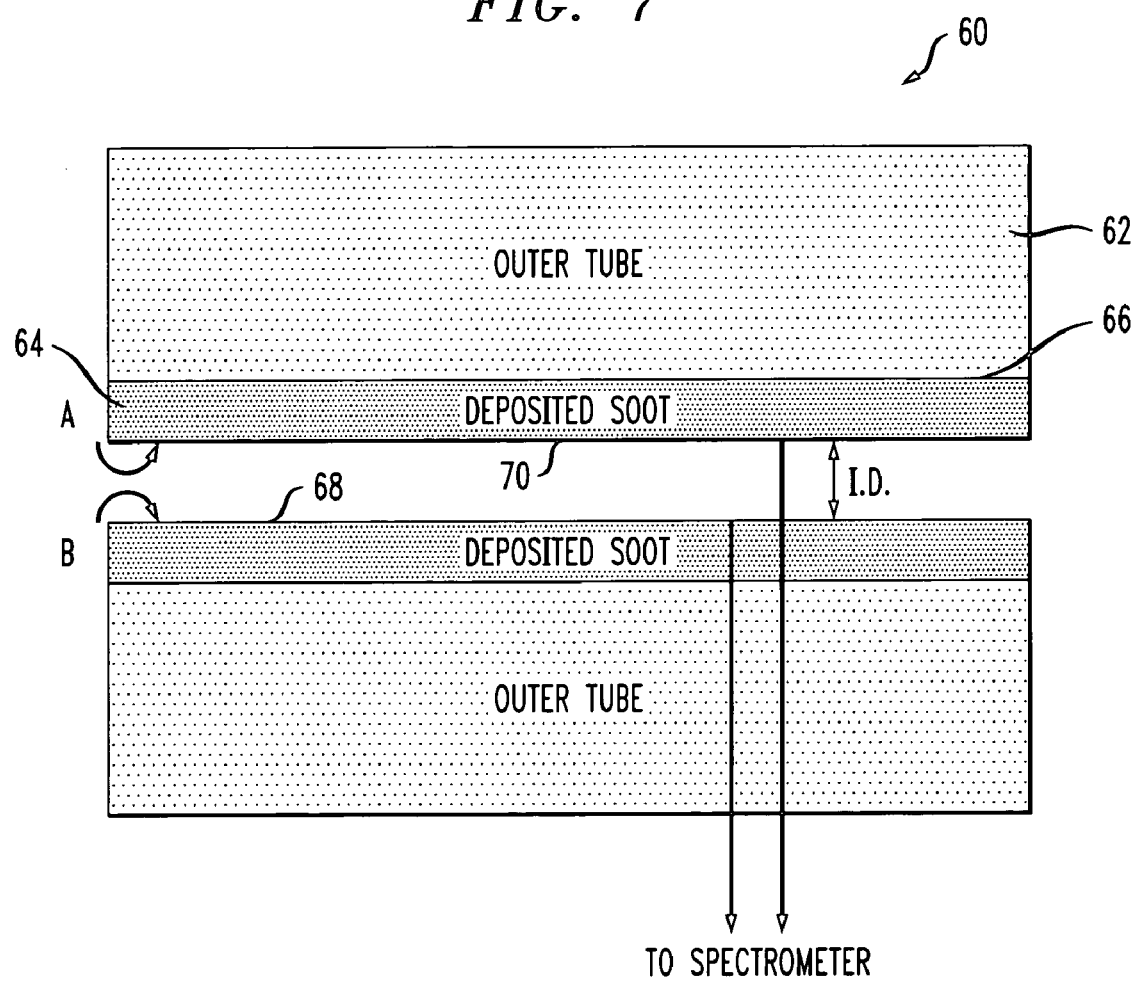
FIG. 7 illustrates an arrangement of the present invention when used to measure the inner diameter of an optical fiber preform including an internal soot layer deposited using an MCVD process.

During the manufacture of preforms using an MCVD process, it is desirable to accurately know the inner diameter of the tube so as to estimate the amount of deposited soot. FIG. 6 and illustrates a cross-section of an exemplary MCVD fiber preform 60. In this particular arrangement, preform 60 comprises an outer preform glass tube 62 with a layer of soot 64 deposited on the inner surface 66 of tube 62. A reflective interferometric measurement arrangement 10-3 of the present invention may be positioned so as to capture reflected signals from near soot interface 68 and far soot interface 70, using these measurements to determine the final preform inner diameter. If the initial inner diameter is also known, the thickness of the deposited soot layer can be easily determined.

The embodiments shown above are intended to be merely illustrative of the inventive concept. Various other embodiments and modifications may be made by those skilled in the art without departing from the spirit and scope of the present invention, as defined by the claims appended hereto.

What is claimed is:

1. A method for determining the absolute physical thickness of an optically transparent object of unknown refractive index, the method comprising the steps of:

transmitting a first broadband optical signal across an optically transparent object in the direction associated with a parameter to be measured;

capturing a first pair of reflected signals from said optically transparent object, a first signal of said first pair associated with a near surface reflection of said object and a second signal of said first pair associated with a far surface reflection of said object;

transmitting a second broadband optical signal across the optically transparent object in opposition to said first broadband optical signal;

capturing a second pair of reflected signals from said optically transparent object, a first signal of said second pair associated with a near surface reflection of said object and a second signal of said second pair associated with a far surface reflection of said object;

determining a separation between said first pair of reflected signals and said second pair of reflected signals by comparing the signals in the spectral domain to determine a beat frequency to determine the absolute physical thickness of the optically transparent object.

* * * * *